Oct. 1, 1974 G. F. HORTON Re. 28,176

BRACKET FOR MOUNTING BOAT ACCESSORY

Original Filed July 14, 1970

GEORGE F. HORTON
INVENTOR

BY Herbert J. Brown

ATTORNEY

United States Patent Office

Re. 28,176
Reissued Oct. 1, 1974

28,176

BRACKET FOR MOUNTING BOAT ACCESSORY

George F. Horton, Rte. 2, Box 718,
Fort Worth, Tex. 76135

Original No. 3,674,228, dated July 4, 1972, Ser. No. 54,819, July 14, 1970. Application for reissue Sept. 28, 1973, Ser. No. 401,812

Int. Cl. F16m *1/02*

U.S. Cl. 248—4 11 Claims

Matter enclosed in heavy brackets [ ] appears in the original patent but forms no part of this reissue specification; matter printed in italics indicates the additions made by reissue.

ABSTRACT OF THE DISCLOSURE

An extensible hinged bracket for mounting a boat accessory such as an auxiliary outboard electric motor on the forward deck, gunwale or transom of a small boat and comprised of a horizontal mounting plate, spaced generally parallel link arms pivotally connected at corresponding ends to the mounting plate for substantially 180° movement thereabove, the remaining ends of said link arms being spaced and pivotally connected to the ends of a movable support on which the accessory is mounted. A cushion is provided at one end of the mounting plate for supporting the accessory when the bracket is retracted.

This invention relates to handling equipment for small boats and has reference to an outwardly extensible hinged bracket for placing a boat accessory in operation in the water and for retracting the bracket and the accessory when the latter is not in use. Although the invention is capable of handling various accessories, for example, anchors and over the side ladders, it is particularly useful for placing small electric outboard motors in the water in operating position and for mounting the motor on the boat when the motor is not in use. Electric outboard motors as herein referred to are usually in addition to other and more powerful means for propelling a boat and the electric outboard motor is used for trolling and fishing in shallow waters without using the more powerful and noisier propelling means. Such electric motors are remotely controlled by an occupant of the boat and the controls for rotating the motor for moving in a desired direction may be by an electrical cable or by a flexible cable and pulley arrangement, both of which are conventional and are only incidently a part of the present invention.

An object of the invention is to provide a convenient and easily operated outwardly extensible hinged bracket for mounting a boat accessory on a small boat.

Another object of the invention is to provide an outwardly extensible hinged boat accessory bracket having a cushion for supporting the accessory when the bracket is in its retracted position.

Another object of the invention is to provide an extensible boat accessory bracket which operates on the principle of a hinged parallelogram and whereby the accessory is in at least a generally horizontal positon when the bracket is retracted.

These and other objects of the invention will become apparent from the following description and the accompanying drawing, in which.

Figure 1:
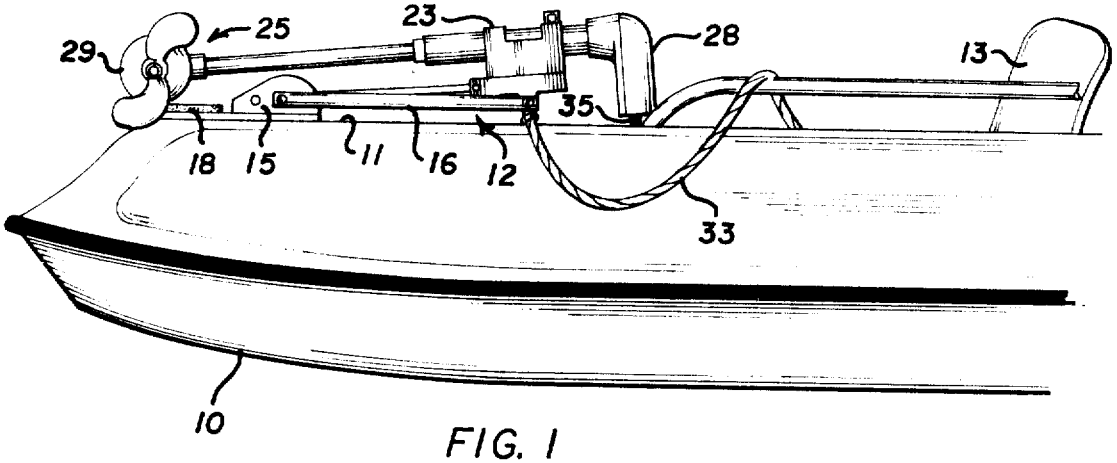
FIG. 1 is a side elevational view of the forward position of a boat and showing the present bracket mounted thereon in its retracted position.

The boat 10 shown in the drawing is exemplary and includes a forward deck 11 on which the present bracket 12 is mounted. However, it is to be understood that bracket 12 may be mounted on other parts of the boat such as by clamping the bracket on the transom, not shown. The top of the back of a seat 13 in which the operator sits is also shown in FIG. 1.

Figure 5:
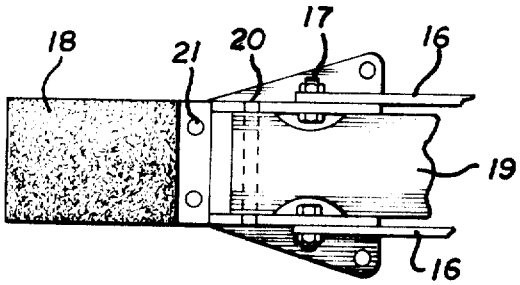
FIG. 5 is a plan view of the mounting plate and cushion and showing broken lengths of the link arm pivotally connected to the plate.

The bracket 12 includes a rectangular horizontal mounting plate 14 having parallel vertical sides 15, and on the outer surface and near the inner end of which sides a pair of link arms 16 are pivotally attached by bolts 17 which form a first pivot axis. The end of the mounting plate 14 opposite the last referred to pivotal connections projects beyond the sides 15 where it is provided with a cushion 18 on the extending upper surface. The cushion 18 is of sponge rubber or other suitable resilient material. Between the mounting plate sides 15, and in the end portion nearest the cushion 18, there is an additional link arm 19 which is pivotally secured at one end between the said sides by a pivot pin 20 which forms a second pivot axis. For reasons which will become apparent, the ends of the pin 20 are flush with or recessed in the outer surfaces of the mounting plate sides 15. For purpose of identification, the first referred to link arms 16 are herein referred to as the inner arms, and the second referred to link arm 19 is referred to as the outer arm. The outer arm 19 is nearly as wide as the distance between the mounting plate sides 15 and for this reason the sides of the arm are notched to clear the heads of the bolts 17 which mount the inner arms 16. See FIG. 5. Bolt holes 21 are also indicated in FIG. 5 for receiving bolts, not shown, when securing the mounting plate 14 on the boat deck 11.

On the extending ends of the inner and outer link arms 16 and 19 there is a channel support 22, and on the outer surface of the web of the support there is, as by welding, a clamping sleeve 23 for engaging the tubular portion 24 of the housing of an electric outboard motor 25. The tubular portion 24 of the motor 25 is adjustably secured in the clamping sleeve 23 by a bolt 26 in outwardly projecting parallel integral ears 27. The outboard motor 25 shown is conventional and is not, therefore, herein described in detail; however, it is pointed out that the upper housing 28 contains means for selectively rotating the drive motor 29 and propeller 30 thereon for directing the boat 10 in the water.

Referring now to the channel shaped support 22 in detail, the inner link arms 16 (which appear as upper arms in FIG. 2) are pivotally connected with the outer surface of side of the support near the end thereof by a single bolt 31 which forms a third pivot axis. Preferably, the support 22 has projecting ears 32 to receive the bolt 31, and there is a tubular sleeve 32 around the bolt for attaching a flexible pull cord 33 which extends to the operator's seat 13. The extending end of the outer link arm 19 is received between the sides of the support 22 and is pivotally attached by means of a pin 34, the ends of which are preferably flush with said sides. Pin 34 forms a fourth pivot axis. The distance between the last described bolt 31 and pin 34, relative to the distance between the first described bolt 17 and pin 20 in the sides 15 of the mounting plate 12, is such that the link arms 16 and 19 are substantially parallel when the arms are in an upright position. Also, the length of the outer arm 19 is less than the length of the inner arms 16 whereby the length of the outboard motor 25 is nearly horizontal, as shown in FIG. 1, when the bracket 12 is retracted. Also at this time the outboard drive motor 29 rests on the cushion 18.

Figure 2:
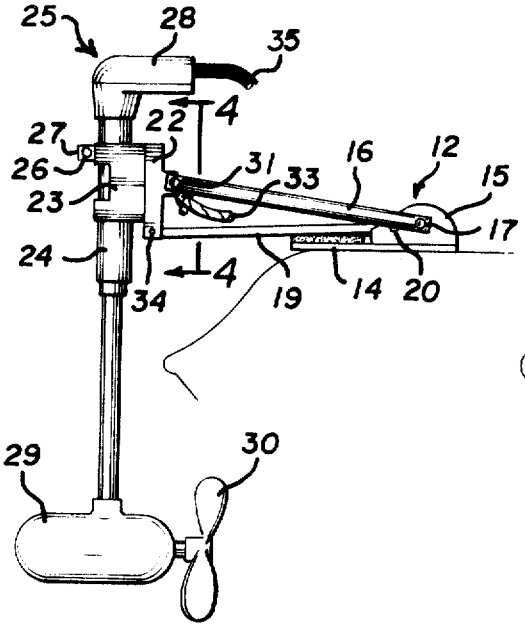
FIG. 2 is an enlarged side elevational view of the bracket in its extended position and showing an electric outboard motor mounted thereon.
Figure 3:
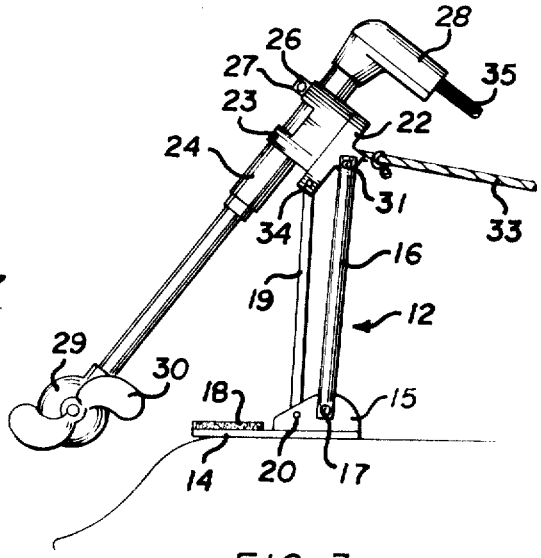
FIG. 3 is a view similar to FIG. 2 but shows the bracket in an intermediate position.
Figure 4:
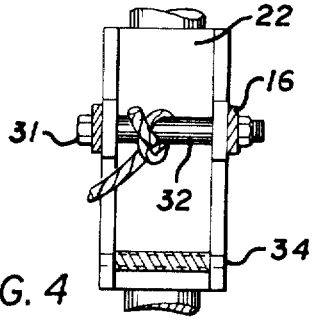
FIG. 4 is a sectional view taken on line 4—4 of FIG. 2.

When transporting the boat 10, as on a trailer, or when the boat is in the water and propelled by a primary source of power, the bracket is in its retracted position. To submerge the propeller 30 the operator initially raises the bracket 12 by hand until the link arms 16 and 19 are just beyond their vertical positions. The bracket 12 is then lowered by the pull cord 33 until the outboard motor 25 assumes a vertical position as shown in FIG. 2, after which the motor is operated by means of a control cable 35 in the usual manner. To retrieve the outboard motor 25 the bracket 12 is retracted by pulling on the cord 33.

The invention is not limited to the exemplary construction herein shown and described but may be made in various ways within the scope of the appended claims.

What is claimed is:

1. Apparatus for mounting a motor to a boat for movement between an extended position and a retracted position, *said motor being of the type having propeller means coupled to one end of an elongated member, said apparatus* comprising:

mounting means *including base means* adapted to be secured to the deck of a boat, first and second arm means having first ends pivotally connected to said mounting means at spaced positions for pivotal movement about first and second spaced pivot axes respectively *above said base means* to allow movement of the other ends of said arm means between extended and retracted positions, said first pivot axis to be located inward of said second pivot axis when said mountaing means is secured in place,

*said first pivot axis being located at a distance above said base means which is at least the same distance between said second pivot axis and said base means,* said second arm means having a length less than the length of said first arm means, and

*support means for holding the other end of said elongated member,*

*said* support means *being* pivotally coupled to the other ends of said first and second arm means at spaced pivot positions for pivotal movement about third and fourth spaced pivot axes respectively to support [a] *the* motor in an operating position *with its propeller* in the water when said first and second arm means are in their extended position and to support [a] *the* motor out of the water when said first and second arm means are in their retracted position, said third pivot axis being formed between said support means and the other end of said first arm means, said fourth pivot axis being formed between said support means and the other end of said second arm means, the distance between said first and third pivot axes being greater than the distance between said second and fourth pivot axes and the distance between said third and fourth pivot axes being greater than the distance between said first and second pivot axes.

2. The apparatus of claim 1 wherein:

said support means comprises means adapted to receive and hold the tubular housing of an electric troll motor, said support means being pivotally coupled to the other ends of said first and second arm means at positions sufficient to locate the tubular housing of a motor in a position generally perpendicular to the water when said first and second arm means in their extended position.

3. The apparatus of claim 2 wherein:

said first and second arm means are adapted to pivot from their extended position about 180° to their retracted position, said support means being coupled to the other ends of said first and second arm means at positions sufficient to locate the tubular housing of a motor in a position generally parallel to the deck of a boat when said first and second arm means are in their retracted position.

4. The apparatus of claim 1 wherein:

said mounting means has an end portion extending in a forward direction for supporting said second arm means when said first and second arm means are moved to their extended position.

5. The apparatus of claim 4 wherein:

said support means comprises means adapted to receive and hold the tubular housing of an electric troll motor, said support means being pivotally coupled to the other ends of said first and second arm means at positions sufficient to locate the tubular housing of a motor in a position generally perpendicular to the water when said first and second arm means in their extended position.

6. The apparatus of claim 5 wherein:

said first and second arm means are adapted to pivot from their extended position about 180° to their retracted position, said support means being coupled to the other ends of said first and second arm means at positions sufficient to locate the tubular housing of a motor in a position generally parallel to the deck of a boat when said first and second arm means are in their retracted position.

7. The apparatus of claim 6 wherein:

said mounting means comprises a plate having extending sides to which said first ends of said first and second arm means are pivotally coupled, said mounting plate being adapted to be secured to a boat deck to locate said extending sides above said mountaing plate, said first arm means comprising substantially straight parallel members coupled to said extending sides on the outside thereof for pivotal movement about said first pivot axis, said second arm means comprising a substantially straight member coupled between said extending sides for pivotal movement about said second pivot axis.

*8. The apparatus of claim 1 wherein:*

*said first pivot axis is located at a distance above said base means which is greater than the distance between said second pivot axis and said base means.*

*9. Apparatus for mounting a motor to a boat for movement between an extended position and a retracted position, said motor being of the type having propeller means coupled to one end of an elongated member, said apparatus comprising:*

*mounting means including base means adapted to be secured to the deck of a boat,*

*first and second arm means having first ends pivotally connected to said mounting means at spaced positions for pivotal movement about first and second spaced pivot axes respectively above said base means to allow movement of the other ends of said arm means between extended and retracted positions,*

*said first pivot axis to be located inward of said second pivot axis when said mounting means is secured in place,*

*said first and second pivot axes being located at about the same distance above said base means,*

*said second arm means having a length less than the length of said first arm means, and*

*support means for holding the other end of said elongated member,*

*said support means being pivotally coupled to the other ends of said first and second arm means at spaced pivot positions for pivotal movement about third and fourth spaced pivot axes respectively to support the motor in an operating position with its propeller in the water when said first and second arm means are in their extended position and to support the motor*

*out of the water when said first and second arm means are in their retracted position,*

*said third pivot axis being formed between said support means and the other end of said first arm means,*

*said fourth pivot axis being formed between said support means and the other end of said second arm means,*

*the distance between said first and third pivot axes being greater than the distance between said second and fourth pivot axes and the distance between said third and fourth pivot axes being greater than the distance between said first and second pivot axes.*

*10. Apparatus for mounting a motor to a boat for movement between an extended position and a retracted position, said motor being an electric troll motor having an elongated tubular housing, said apparatus comprising:*

*mounting means including a mounting plate means adapted to be secured to the deck of a boat,*

*first and second arm means having first ends pivotally connected to said mounting means at spaced positions for pivotal movement about said first and second spaced pivot axes respectively above said mounting plate means to allow movement of the other ends of said arm means between extended and retracted positions,*

*said first pivot axis to be located inward of said second pivot axis when said mounting means is secured in place,*

*said second arm means having a length less than the length of said first arm means, and*

*support means for holding the other end of said elongated housing,*

*said support means being pivotally coupled to the other ends of said first and second arm means at spaced pivot positions for pivotal movement about third and fourth spaced pivot axes respectively to support the motor in an operating position in the water when said first and second arm means are in their extended position and to support the motor out of the water when said first and second arm means are in their retracted position,*

*said third pivot axis being formed between said support means and the other end of said first arm means,*

*said fourth pivot axis being formed between said support means and the other end of said second arm means,*

*the distance between said first and third pivot axes being greater than the distance between said second and fourth pivot axes and the distance between said third and fourth pivot axes being greater than the distance between said first and second pivot axes,*

*said mounting plate means having an end portion extending in a forward direction for supporting said second arm means when said first and second arm means are moved to their extended position and for supporting said motor when said first and second arm means are moved to their retracted position,*

*said first and second arm means having relative lengths, said four pivot axes having a given relationship with respect to each other, and said first and second pivot axes being located at distances above said mounting plate means relative to each other;*

*a. sufficient to lock said motor against said extending end portion of said mounting plate means and to prevent said arm means from being pivoted from their retracted position to their extended position when an upward force is applied to said motor but to allow said first and second arm means to be pivoted from their retracted position to their extended position by initially lifting up on said other ends of said first and second arm means, and*

*b. sufficient to cause said elongated housing to maintain said motor at about the same level as that of said mounting plate means as said other ends of said first and second arm means are lifted upward from their retracted position to at least a position where said first and second arm means are at about a vertical position.*

*11. The apparatus of claim 10 wherein said first and second pivot axes are located at about the same distance above said mounting plate means.*

References Cited

The following references, cited by the Examiner, are of record in the patented file on this patent or the original patent.

UNITED STATES PATENTS

| | | | |
|---|---|---|---|
| 596,931 | 1/1898 | Yunck | 248—281 X |
| 899,781 | 9/1908 | Anderson | 248—281 X |
| 3,119,365 | 1/1964 | Evans | 248—4 X |
| 3,245,640 | 4/1966 | Dobbs | 248—4 |
| 3,486,724 | 12/1969 | Adamski | 248—284 X |

FOREIGN PATENTS

| | | | |
|---|---|---|---|
| 1,004 | 1/1916 | Netherlands | 115—17 |

J. FRANKLIN FOSS, Primary Examiner

U.S. Cl. X.R.

115—17